United States Patent
Gurumurthy et al.

(10) Patent No.: US 7,483,819 B2
(45) Date of Patent: Jan. 27, 2009

(54) REPRESENTING DATA HAVING MULTI-DIMENSIONAL INPUT VECTORS AND CORRESPONDING OUTPUT ELEMENT BY PIECE-WISE POLYNOMIALS

(75) Inventors: Girishankar Gurumurthy, Chennai (IN); Shitanshu Krishnachandra Tiwari, Vasai(W) (IN); Hugh Thomas Mair, Fairview, TX (US); Sumanth K Gururajarao, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 502 days.

(21) Appl. No.: 10/904,973

(22) Filed: Dec. 7, 2004

(65) Prior Publication Data
US 2006/0123074 A1   Jun. 8, 2006

(51) Int. Cl.
*G06F 17/10* (2006.01)
(52) U.S. Cl. .............................. 703/2; 703/14
(58) Field of Classification Search ................ 703/2, 703/14; 348/243; 73/573; 705/17
See application file for complete search history.

(56) References Cited

U.S. PATENT DOCUMENTS

| | | | | |
|---|---|---|---|---|
| 5,729,694 | A * | 3/1998 | Holzrichter et al. | 705/17 |
| 6,289,734 | B1 * | 9/2001 | Daugela | 73/573 |
| 2004/0019468 | A1 * | 1/2004 | De Moura et al. | 703/2 |
| 2004/0263648 | A1 * | 12/2004 | Mouli | 348/243 |

OTHER PUBLICATIONS

Achar et al., R. Full-Wave Analysis of High-Speed Interconnects Using Complex Frequency Hopping, IEEE Transactions on Computer-Aided design of Integrated Circuits ad Systems, vol. 17, No. 10, Oct. 1998, pp. 997-1016.*
Gourary et al., M. Simulation of High-Q Oscillators, IEEE/ACM International Computer-Aided Design, Nov. 1998, pp. 162-9.*
Dong et al., Piecewise Polynomial Nonlinear Model Reduction, Proceedings of the 40th Conference on Design Automation DAC '03, Jun. 2003, pp. 484-9.*
Pavlidis, T. Piecewise Approximation of Functions of Two Variables Through Regions with Variable Boundaries, Proceedings of the ACM Annual Conference, Aug. 1972, pp. 652-62.*
Gaofeng Wang and Runip Gopisetty "Efficient Generation of Timing and Power Polynomial Models from Lookup Tables for SoC Designs" in 12th IEEE International ASIC/SOC conference, Washington, DC, Sep. 1999.

* cited by examiner

*Primary Examiner*—Russell Frejd
(74) *Attorney, Agent, or Firm*—Alan K. Stewart; W. James Brady; Frederick J. Telecky, Jr.

(57) ABSTRACT

Determining piece-wise polynomials which together would represent large data sets having multi-dimensional input vectors and corresponding output element. In an embodiment, a function/procedure/routine is recursively called/invoked to determine piece-wise polynomial is a data set cannot be entirely modeled by one polynomial. Another aspect of the present invention reduces the number of combinations (of orders for sub-polynomials forming the polynomials) to be tried in determining polynomials, meeting various accuracy requirements. Such a reduction is obtained based on a recognition that when the order in one dimension alone is increased and the result does not lead to acceptable accuracy of the polynomial, the combinations with a lesser number for the order (of the dimension) can be ruled out.

8 Claims, 6 Drawing Sheets

```
310:  fit_piecewise_polynomial (Unresolved_data, present_split_dimension)
      {
320:    present_sub_domain = Initial sub domain of Unresolved_data along present_split_dimension.

325:    while (unresolved_data .ne. NULL-SET)
330:    do
        {
340:      return_state = curve_fit_lse( present_sub_domain );
345:    } while( accuracy not met [and] max_order not reached);

350:    if( (return_state == FALSE) [and] no.of points in present_sub_domain along present_split_dimension==2 )
351:    { temp = present_split_dimension;
353:      change present_split_dimension;
356:      fit_piecewise_polynomial (present_sub_domain, present_split_dimension );
357:      remove present_sub_domain from unresolved_data;
358:      present_split_dimension = temp
359:      present_sub_domain = Initial sub domain of [unresolved_data];
360:    }
361:    elsif( (return_state == FALSE)
364:    {
365:      remove previous_sub_domain from unresolved_data;
367:      present_sub_domain = Initial sub domain of [unresolved_data];
370:    }
375:    elsif(return_state == TRUE)
376:    {
377:      previous_sub_domain = present_sub_domain;
378:      increase range of present_sub_domain along present_split_dimension;
379:    }
380:  }
381: }
```

REPRESENTING DATA HAVING MULTI-DIMENSIONAL INPUT VECTORS AND CORRESPONDING OUTPUT ELEMENT BY PIECE-WISE POLYNOMIALS

BACKGROUND OF THE INVENTION

1. Field of the Invention

The present invention relates to computer-implemented data modeling, and more specifically to a method and apparatus for representing data, having multi-dimensional input vectors and corresponding output element, by piece-wise polynomials.

2. Related Art

There are several instances in which data having multi-dimensional input vectors and corresponding output element is present. For example, data representing cell library characterization (used in computer aided design of integrated circuits) may contain several dimensions to each input vector (e.g., fabrication process, voltage, temperature, an output load, input transition time), and corresponding output elements (e.g., delay offered, timing constraint, leakage power, power consumed) for each cell-type in a library.

There is often a need to represent such data by a polynomial. As an illustration, in the case of cell library characterization, assuming that the data corresponding to each output element is represented in the form of a table, there could be several possible values for each dimension, thereby making the size of the table very large. For example, assuming that there are X1, X2, X3, . . . XN possible values for each of N-dimensions (in the input vectors), the total number of rows in the table would be X1*X2*X3 . . . *XN (wherein * represents the multiplication operation.)

As may be appreciated from the above computation, the total number of rows in a table (for an output element) can become large with a large number of dimensions and/or a large number of possible values for each dimension. One problem with such large number of rows in a table is that determining the output element for a specific input vector combination may require unduly high resources (e.g., a large memory to store the entire table or a large number of computations using techniques such as hashing).

Accordingly, there has been recognised a general need to model such large volumes of data with a polynomial, having a variables corresponding to the dimensions of the input vectors. The polynomial should ideally generate the same value of the output element when the corresponding specific value combination for an input vector is substituted for the variable in the polynomial. Accordingly, once the polynomial is accurately determined, the specific output element value for an input vector value combination, can be computed by using the polynomial.

Several general techniques have been attempted in the relevant arts to determine such polynomials. Once such technique is based on curve fitting, in which a curve is sought to be computed mathematically such that deviations of the computed values from the actual are within an acceptable range.

One problem with such curve fitting technique is that no curve may be present (even in theory) to fit all the data for a specific output element value. Accordingly, it has been proposed to partition the entire data set into multiple subsets, with a piece-wise polynomial being determined for each subset (with the desired degrees of accuracy). For example, it has been proposed CAD tool vendors such as Synopsis Inc. (of Mountain View Calif.) that cell library characterization data can be provided in the form of piece-wise polynomials.

What is therefore required is a method and apparatus for representing data, having multi-dimensional input vectors and corresponding output element, by piece-wise polynomials.

BRIEF DESCRIPTION OF THE DRAWINGS

The present invention will be described with reference to the following accompanying drawings.

In the drawings, like reference numbers generally indicated identical, functionally similar, and/or structurally similar elements. The drawing in which an element first appears in indicated by the leftmost digit(s) in the corresponding reference number.

DETAILED DESCRIPTION

1. Overview

An aspect of the present invention enables representation of a data set, having multi-dimensional input vectors and corresponding output element, by piece-wise polynomials. Such a result is achieved by determining a polynomial representing a largest portion of the data set along a split dimension (one of the dimensions of the input vectors). If the portion does not represent/cover the entire data set, another polynomial is sought to be determined for the unrepresented (unresolved) portion of the data set along another split dimension. Polynomials are continued to be determined in such a fashion until the set of piece-wise polynomials represent the entire data set.

In an embodiment using software instructions executing on a digital processing system, the recursion feature is conveniently used to simplify the programming logic in determining such polynomials.

In one embodiment, each (piece-wise) polynomial contains several sub-polynomials, which are multiplied to generated the polynomial. Each sub-polynomial corresponds to one dimension of the input vector, and can have a corresponding maximum order specified by a user. In general, the combination of the sub-polynomials (forming the polynomial) needs to model the data set (or a portion, as described above) such that the computed value is within an acceptable error range (compared to the actual value specified by the data set).

An aspect of the present invention minimizes the number of combinations of orders tried/attempted in determining acceptable polynomials based on a recognition that when the order in one dimension alone is increased and the result does not lead to acceptable accuracy of the polynomial, the combination with a lesser number for the order (of the dimension) can be ruled out. Such an approach minimizes the number of combinations of orders tried in determining an acceptable combination of orders, as well as to determine that no acceptable combination (and thus polynomial) exists.

Various aspects of the present invention are described below with reference to an example problem. Several aspects of the invention are described below with reference to examples for illustration. It should be understood that numerous specific details, relationships and methods are set forth to provide a full understanding of the invention. One skilled in the relevant are, however, will readily recognize that the invention can be practiced without one or more of the specific details, or with other methods, etc. In other instances, well-known structures or operations are not shown in detail to avoid obscuring the features of the invention.

2. Digital Processing System

Figure 1:
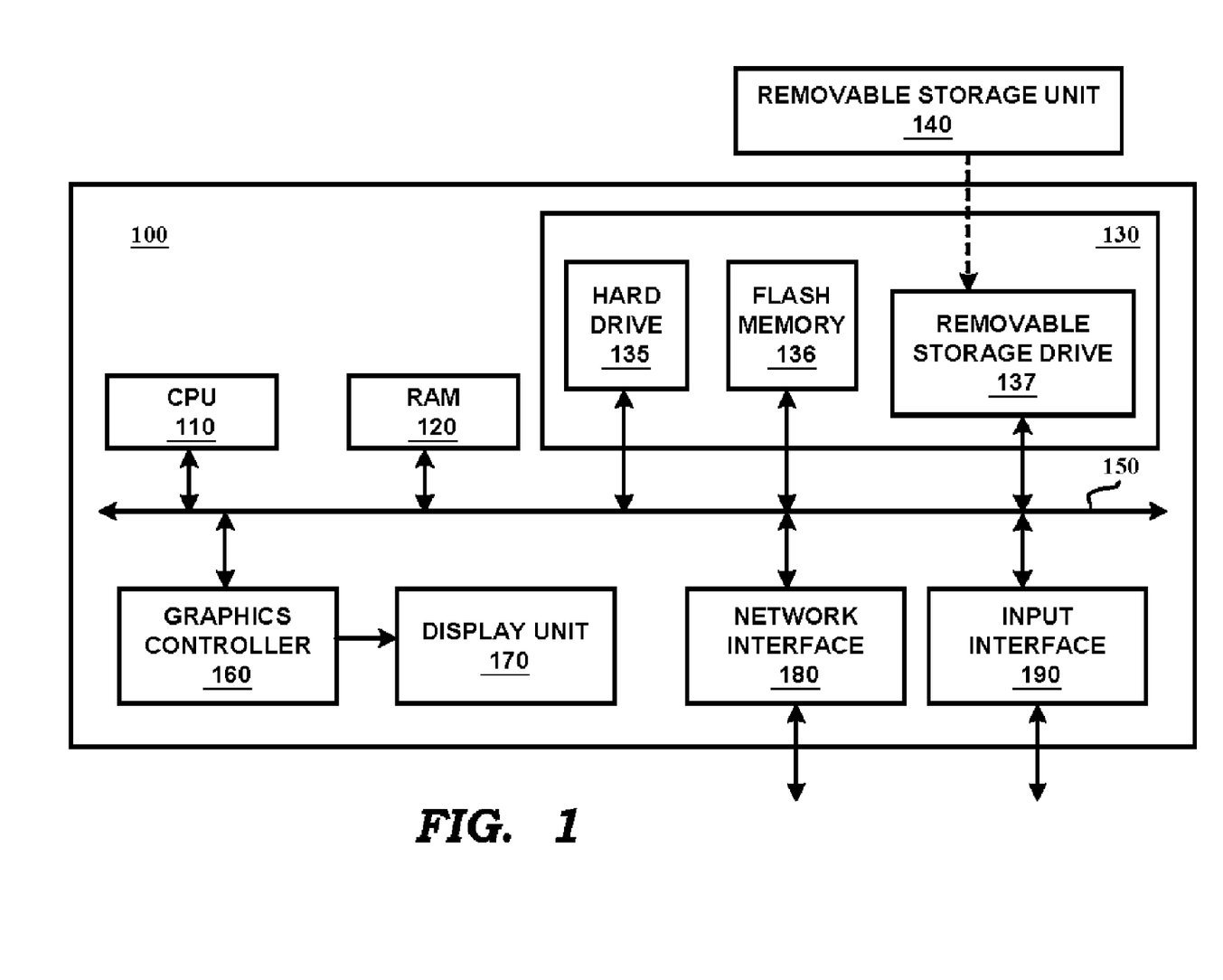
FIG. 1 is a block diagram of a digital processing system in which various aspects of the present invention can be implemented.

FIG. 1 is a block diagram illustrating the details of digital processing system 100 implemented substantially in the form of software in an embodiment of the present invention. System 100 may be used in computer aided design (CAD) of integrated circuits (e.g., using cell libraries with pre-characterized data). System 100 may contain one or more processors such as central processing unit (CPU) 110, random access memory (RAM) 120, secondary memory 130, graphics controller 160, display unit 170, network interface 180, and input interface 190. All the components except display unit 170 may communicate with each other over communication path 150, which may contain several buses as is well known in the relevant arts. The components of FIG. 1 are described below in further detail.

CPU 110 may execute instructions stored in RAM 120 to provide several features of
the present invention. CPU 110 may contain multiple processing units, with each processing
unit potentially being designed for a specific task. Alternatively, CPU 110 may contain only
a single general purpose processing unit. RAM 120 may receive instructions from secondary memory 130 using communication path 150. The instructions may implement one or more of the various user application, access module, access module, procedures, etc., described above.

Graphics controller 160 generates display signals (e.g., in RGB format) to display unit 170 based on data/instructions received from CPU 110. Display unit 170 contains a display screen to display the images defined by the display signals. Input interface 190 may correspond to a key-board and/or mouse. In the case of access module 350, graphics controller 160 and input interface 190 enables an user to provide search criteria, view results, and select operations etc.

Secondary memory 130 may contain hard drive 135, flash memory 136 and removable storage drive 137. Secondary memory 130 may store the data and software instructions (e.g., methods instantiated by each of client system), which enable system 100 to provide several features in accordance with the present invention. Some or all of the data and instructions may be provided on removable storage unit 140, and the data and instructions may be read and provided by removable storage drive 137 to CPU 110. Floppy drive, magnetic tape drive, CD-ROM drive, DVD Drive, Flash memory, removable memory chip (PCMCIA Card, EPROM) are examples of such removable storage drive 137.

Removable storage unit 140 may be implemented using medium and storage format
compatible with removable storage drive 137 such that removable storage drive 137 can read
the data and instructions. Thus, removable storage unit 140 includes a computer readable storage medium having stored therein computer software and/or data.

In this document, the term "computer product" is used to generally refer to
removable storage unit 140 or hard disk installed in hard drive 135. These computer program products are means for providing software to system 100. CPU 110 may retrieve the software instructions, and execute the instructions to represent data, having multi-dimensional input vectors and corresponding output element, by piece-wise polynomials.

3. Method

Figure 2:
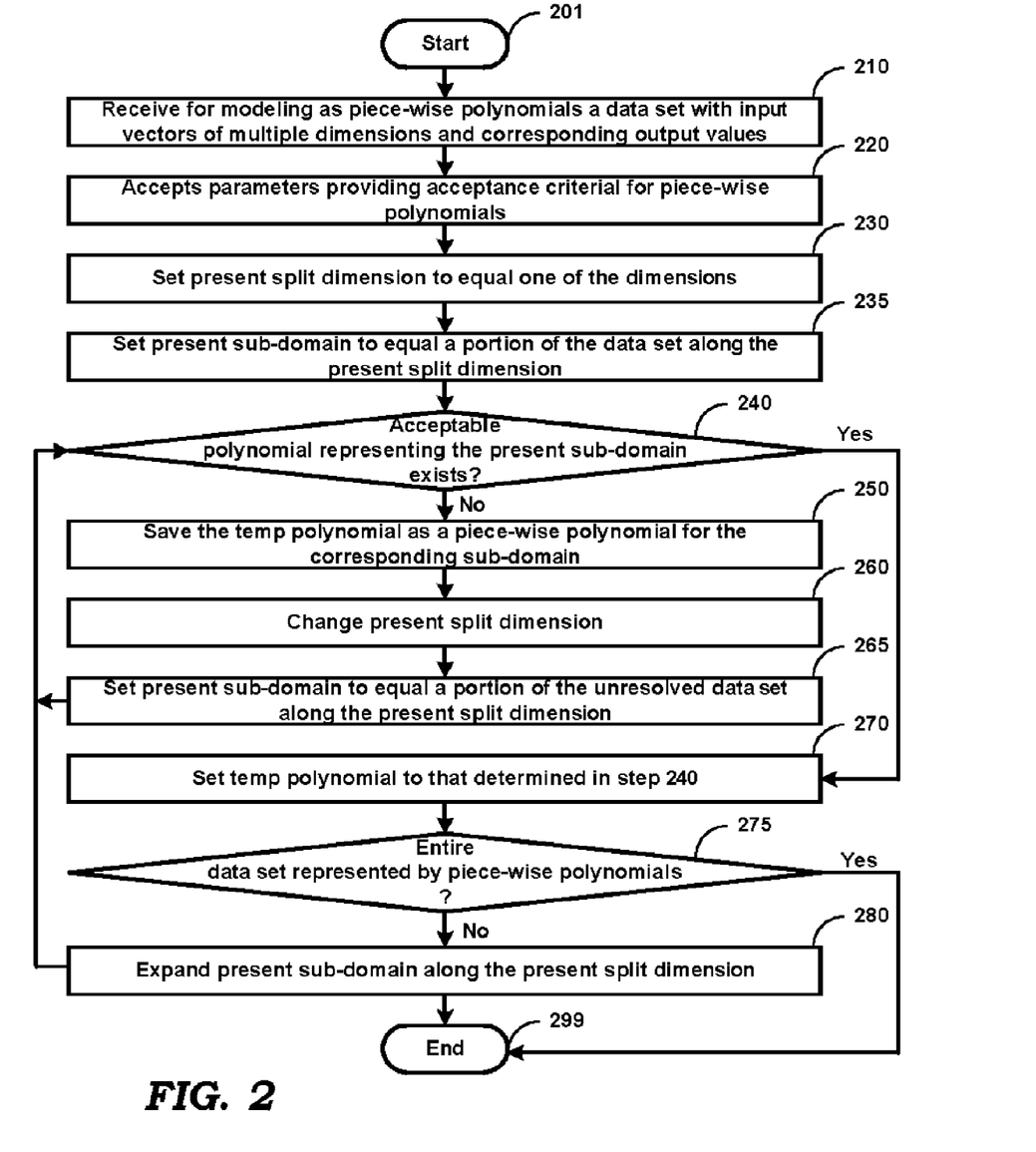
FIG. 2 is a flow-chat illustrating the manner in which data can be represented by piece-wise polynomials according to various aspects of the present invention.

FIG. 2 is a flow-chart illustrating the manner in which piece-wise polynomials can be determined to represent data, having multi-dimensional input vectors and corresponding output element. The flow-chart is described with respect to digital processing system 100 of FIG. 1. However, the approach(es) can be implemented in various other systems as well. In addition, the flow-chart is described with respect to a simplified scenario of data set used for modeling, merely for understandability of some features of the present invention. A more comprehensive approach is described below with reference to FIG. 3.

The flow-chart starts in step 201, in which control immediately passes to step 210. In step 210, digital processing system 100 receives for modeling as polynomials, a data set with input vectors of multiple dimensions and corresponding output values. The data can be provided in various forms, e.g., as plain text in a file on a secondary storage according to a pre-specified format. At least while generating polynomials, portions of the received data can be stored in (or retrieved into) RAM 120.

In step 220, digital processing system 100 accepts parameters providing acceptance critical for piece-wise polynomials. The parameters may indicate the specific maximum amount (either as absolute number or as a fraction of the actual value) by which a computed value (using polynomial) can deviated from the corresponding output value, the maximum order of any sub-polynomials, and the permissible aggregate error (e.g., as a root mean square value of deviations). In general, these parameters are used to determine whether an (sub-) polynomial accurately models a corresponding data portion, as described below with respect to step 240.

In step 230, digital processing system 100 sets the present split dimension equal one of the dimensions on the input vectors. In one embodiment, the first dimension is used as the present split dimension. However, alternative approaches can be used to meet various requirements (e.g., to minimize computational complexity, to fit the data into fewer piece-wise polynomials).

In step 235, digital processing system 100 sets the present sub-domain to equal a portion of the data set along the present split dimension. In one embodiment described below, a small number of points (e.g., 2) along the split dimension, along with all the (input)points in the other dimensions, is selected. Such an approach ensures that eventually at least two points can be modeled by a piece-wise polynomial. However, alternative approaches can be used to determine different sizes of the sub-domains as starting points.

In step 240, digital processing system 100 determines whether there exists an acceptable polynomial representing the present sub-domain. Approaches such as curve-fitting, well known in the relevant arts, can be used to determine the existence of the polynomial, as well as the polynomial itself. The parameters received in step 220 are used to determine whether the polynomial is acceptable. Control transfers to step 250 if no such polynomial is found, and to step 270 otherwise.

In step 250, digital processing system 100 saves the temp polynomial (of step 270) as a piece-wise polynomial for the corresponding sub-domain. It should be understood that several of such piece-wise polynomials may together represent the entire data set. For simplicity it is assumed that control already passed to step 270, and the temp polynomial is already set.

In step 260, digital processing system 100 changes the present split dimension. In one embodiment, the next dimension in the sequence of the input data vector dimensions, is selected as the present split dimension. For example, assuming that input vectors are of n-dimensions and represented by a1, a2, a3, ..., an, and assuming that dimension a2 was used before step 250 as the present dimension, the present dimension is set to a3.

In step 265, digital processing system 100 sets the present sub-domain to equal a portion of the unresolved data set along the present split dimension. In other words, a new piece-wise polynomial is attempted for the unresolved (i.e., data set portion not yet represented by piece-wise polynomials) portion of the data set, but with the sub-domain expansion (of step 280 with the present split dimension set in step 260). Control then passes to step 240.

In step 270, digital processing system 100 determines whether the entire data set is represented by the polynomial (after an acceptable polynomial if found in step 240). If the result of determination is positive, control passes to step 299 (where the flow-chart ends), and to step 280 otherwise. In step 280, digital processing system 100 expands the present sub-domain along the present split dimension. That is, additional data points along the present split dimension are sought to be added, and a polynomial is sought to be determined in step 240 for the expanded sub-domain.

It should be understood that the flow-chart of FIG. 2 represents a general approach using which piece-wise polynomials representing multi-dimensional input vectors and corresponding output data element, can be determined. However, the approach may be implemented easily using recursion principles, as described below with an example embodiment.

4. Recursive Approach

Figure 3:
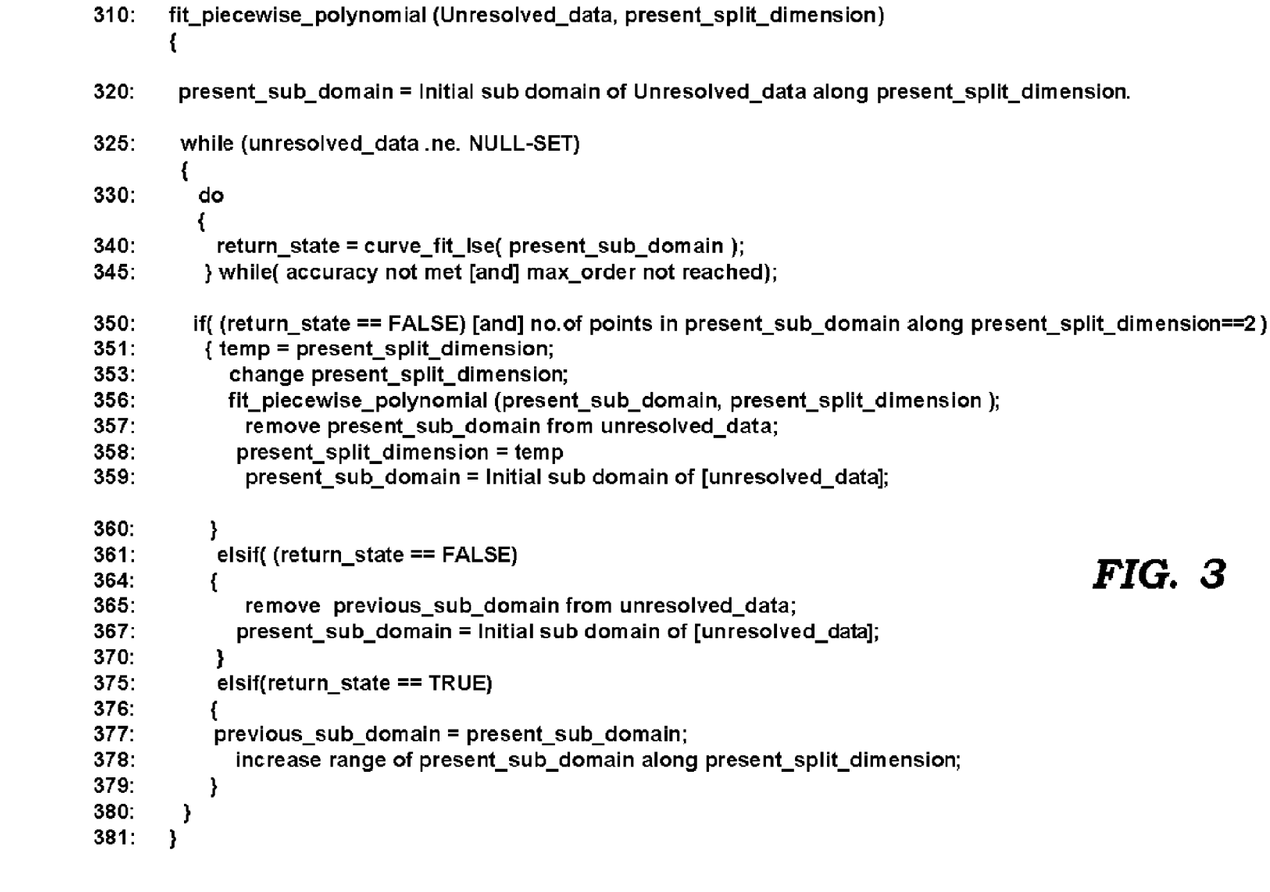
FIG. 3 contains pseudo-code illustrating the manner in which recursion principle can be used to generate piece-wise polynomials according to various aspects of the present invention.

FIG. 3 contains pseudo-code for a function "fit_piecewise_polynomial" (line 310), which determines piece-wise polynomials for "Unresolved_data" received as a first parameter. The function also receives a present_split_dimension as a second parameter. Piece-wise polynomials for entire data set can be generated by calling the function with the entire data set and one of the dimensions of the input vectors as parameters, as described below in further detail.

In line 320, a variable 'present_sub_domain' is set equal to an initial sub-domain of present_data_set taken along present_split_dimension. That is, present_sub_domain is set to 2 lines of the data along the present_split_domain, but covering the remaining dimensions of Unresolved_data. In such an approach, the range of the $present_{13}$ sub_domain is increased until a polynomial cannot be found, or if all the data set is covered by a single polynomial.

The loop of lines 330-380 is executed until all points of the Unresolved_data are represented by piece-wise polynomials due to the operation of the while statement in line 325.

The loop of lines 330-345 operates to determine a polynomial that represents the present_sub_domain by using techniques such as curve-fitting (line 340), well known in the relevant arts. The polynomial needs to meet the various acceptance criteria, as also indicated by the while condition of line 345. The result of curve-fitting is stored in variable return_state (line 340) when the loop of lines 330-345 is exited.

It may be appreciated that the result at the end of execution of the do loop lines 330-345 can be true of false. In case the result is true, lines 377 and 378 are executed. The result can be false in two scenarios—(1) when the number of points along the split dimension equals 2, and (2) after more than two points are contained along the present split dimension. Lines 351-359 are executed in the first scenario and lines 356-367 are executed in the second scenario as described below.

With respect to the scenario when the do loop of lines 330-345 return a false result and the number of points along the split dimension equals 2, in line 351, a variable temp is set equal to present_split_dimension. In line 353, the present_split_dimension is changed since a polynomial is not found for the smallest portion along the split dimension.

The function of line 310 is then called recursively with the present_sub_domain as the first parameter, and the present_split_dimension as the second parameter. It should be appreciated that the function returns only after the data in the present sub-domain (2 points in the present_split_dimension) are completely resolved (i.e., represented by one or more polynomials). In the worst case, a polynomial is generated for 2×2×2×2 . . . present_sub_domain, and in theory such a polynomial can always be generated.

Continuing with the description of FIG. 3, the present_sub_domain is removed from unresolved_data, given that the polynomials are generated for the present_sub_domain used in the function call of line 356. The present_split_dimension is again restored by setting the present_split_dimension to temp in line 358.

In line 359, the present_sub_domain is set to the initial sub domain of the unresolved_data. The data is taken again along the present split dimension. Line 359 may be performed similar to line 320.

With respect to line 365, it is again noted that lines 365-367 are executed if the return_state of line 340 equals false and there are more than 2 lines in the present_split dimension. In such a case, the polynomial corresponding to the resolved portion is stored (not shown in Figure,) the previous_sub_domain (corresponding to the resolved portion) is removed from the unresolved_data. In line 367, the present_sub_domain is set to the initial sub-domain of the unresolved data (as in line 320).

With respect to line 377, as noted above, line 377 and 378 are executed if the return_state of line 340 is set to true (i.e., an acceptable polynomial is found for the present_sub_domain. In line 377, the variable previous_sub_domain is set equal to present_sub_domain (and used in line 365, as described above). In line 378, the range of present_sub_domain is increased along present_split_dimension. The range is gradually increased (e.g., one line at a time) until the entire data set is modeled as a single polynomial or until the increased data set cannot be modeled as a single polynomial. As a result, the number of polynomials to represent a large data set is reduced.

It may be appreciated that the pseudo-code of FIG. 3 operates to recursively execute the function, and determine the piece-wise polynomials. The operation is illustrated with an example below.

5. Example

Figure 4A:
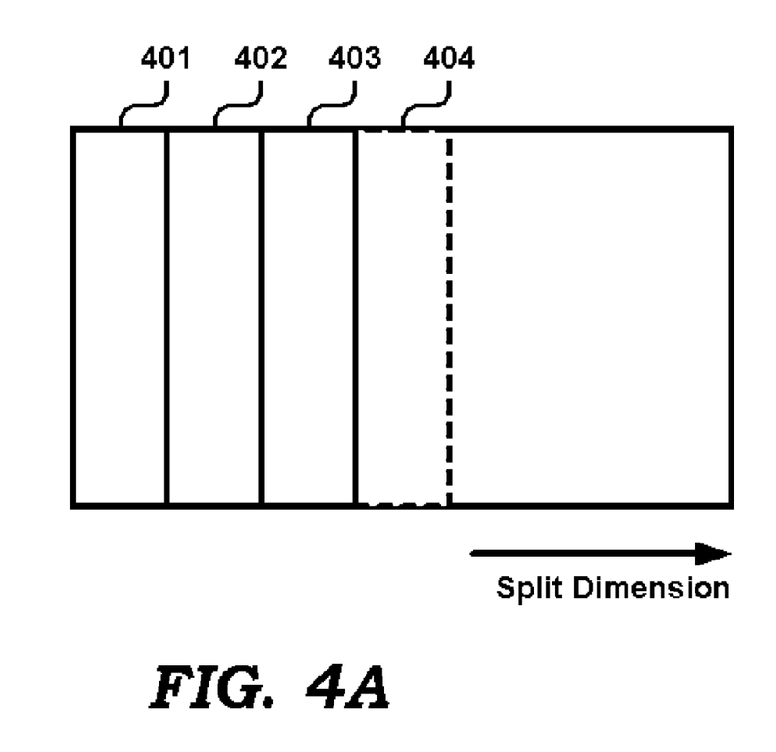
FIGS. 4A-4C together illustrate the manner in which data is partitioned into smaller parts, for representation as corresponding piece-wise polynomial in an embodiment of the present invention.

FIGS. 4A though 4D together illustrate the manner in which the code of FIG. 3 operates to determine piece-wise polynomials according to an aspect of the present invention. For simplicity, it assumed that the input vectors are of two dimensions (X and Y), and are represented by a rectangle. It is assumed that the entire data of FIG. 4A is provided as the first parameter and dimension X as the present_split_dimension.

The present_sub_domain is initially set to portion 401. It is assumed that an acceptable polynomial is found for portion 401, and the present_sub_domain is then extended to cover portion 402 as well (in line 379). Again, assuming that an acceptable polynomial is found for portions covering 401 and 402, the present_sub_domain is extended to cover portion 403. It is assumed that an acceptable polynomial is found again for the combined portions 401-403. At this point, the previous$_{sub}$_domain is contains portions 401-403 together.

When a polynomial is sought to be computed for portions 401-404 together, it is assumed that an acceptable polynomial is not found and thus control passes to line 365. In line 365, the previous_sub_domain (covering areas 401-403) is removed from the unresolved_data, and the present_sub_domain is set to the initial sub-domain of the unresolved data (all the data portion except portions 401-403). For illustration, it is assumed that the initial sub_domain contains only 2 lines along the X-dimension.

It is now assumed that an acceptable polynomial is not found for portion 404. Since portion 404 contains only 2 line along the present_sub_domain, control passes to lines 351. The present_split_dimension is changed to Y-axis and present_sub_domain function ("second instance of the function") is called with portion 404 as the first parameter and Y-axis as the present split dimension. It is assumed that in multiple iterations an acceptable polynomial is found for portions covering 411-413 shows in FIG. 4B.

Figure 4B:
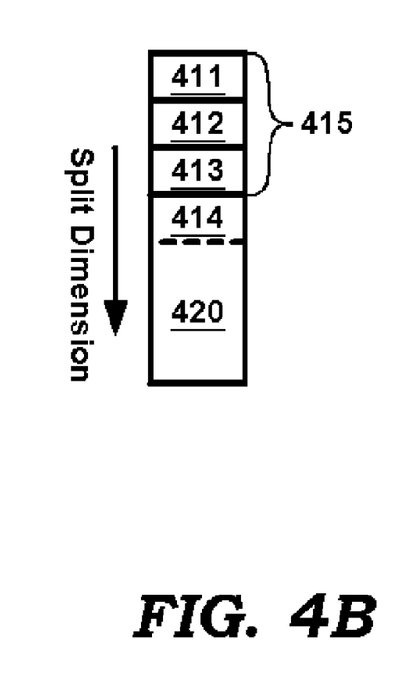

Assuming that an acceptable polynomial is not found when the present_sub_domain is extended to cover 414 also, control passes to step 365. Though not shown, a polynomial is stored corresponding to portions 411-413. The initial_sub_domain is set to portion 414. Assuming that an acceptable polynomial is found while extending the present_sub_domain from portion 414 to cover portion 420 as well, the second instance of the function exists after determining two polynomials to cover portion 404. Control then passes to line 357 of the first instance of the function.

Figure 4C:
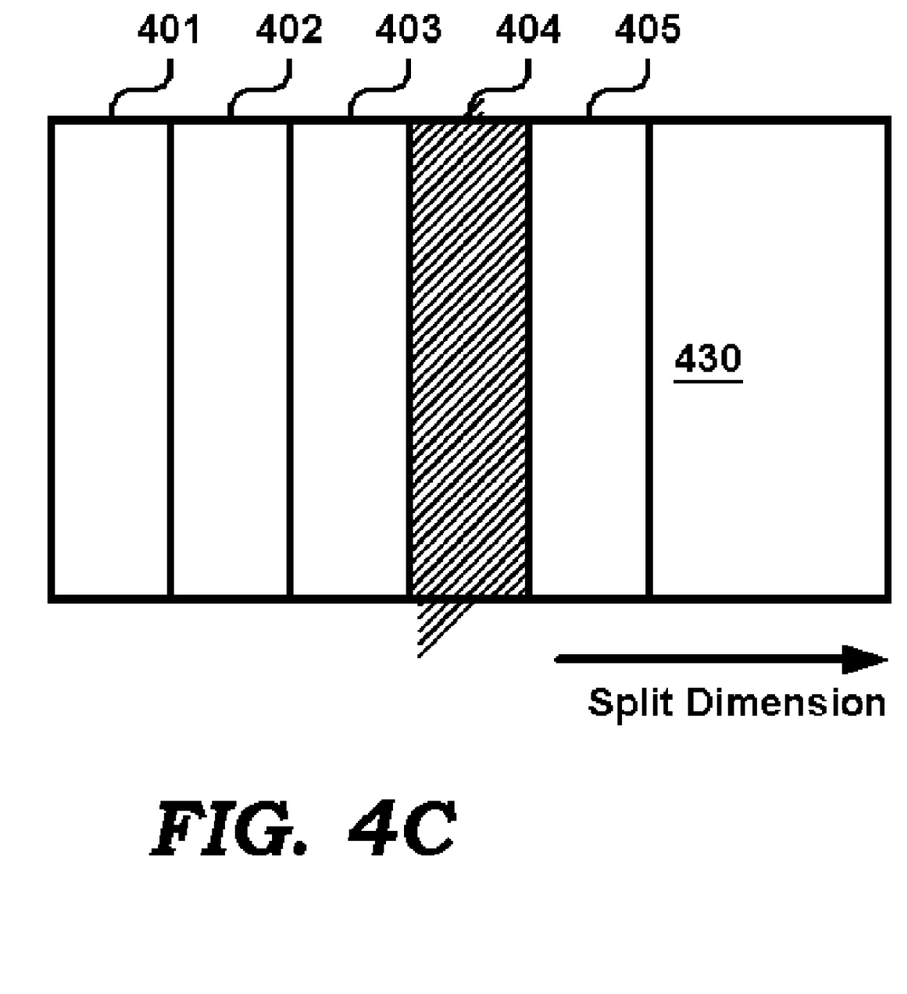

In line 357 the unresolved portion is set to portion 430 of FIG. 4C (i.e., all the shown data except portions 401-404). The present_sub_domain is set to portion 405. Assuming the present_sub_domain is gradually extended to cover portion 430, and an acceptable polynomial is found for the entire portion 430, the first instance of the function exits. The total data set is thus represented by four polynomials covering four corresponding portions (401-403, 411-413, 420 (including 414), and 430 (including 405).

It should be understood that the approach of above can be used with a higher number of dimensions, though the example scenario is shown only with 2 dimensions for simplicity. The description is continued with respect to the manner in which the piece-wise polynomials (of line 340) are determined in an embodiment of the present invention.

6. Curve Fitting

In one embodiment, each piece-wise polynomial (sought to be computed) contains a number of sub-polynomials equaling the number of dimensions of the input vectors. Each sub-polynomial is turn is characterized by a corresponding order. For example, a sub-polynomial of order 2 for variable X1 (in dimension 1) would be of the form (a1 $X1^2$+a2 X1+a2), wherein a1, a2 and a3 are integers representing the coefficients. The piece-wise polynomial is formed by multiplying all such sub-polynomials.

One of the parameters (step 220) indicates a corresponding maximum order for each of the sub-polynomials. Such maximum order ensures that 'overfit situation' is avoided. Overfit represents a scenario when a higher order chosen to reduce the aggregate error causes the error with respect to some individual points to exceed acceptable thresholds, as is well known in the relevant orders. Accordingly, it is desirable that sub-polynomials be determined without violating the corresponding maximum order requirement.

It may be further appreciated that the loop of lines 340 and 345 is executed with a combination of values for the orders of the sub-polynomials. An aspect of the present invention enables the number of such combinations to be tried, to be reduced. It is helpful to understand a prior approach of the order in which the combinations are tried to appreciate the advantages of the aspect of the present invention. Accordingly, the prior approach is described first below with respect to FIG. 5.

Figure 5:
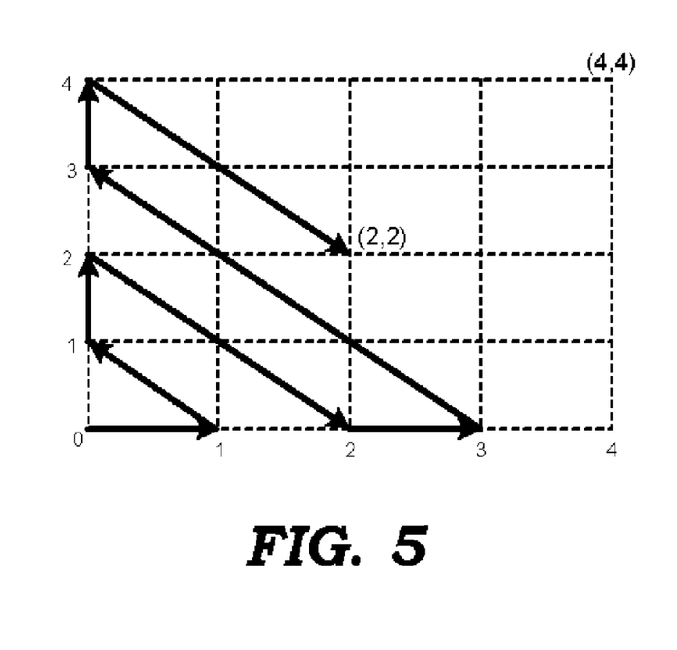
FIG. 5 is a graph illustrating the manner in which various combinations of orders of sub-polynomials are tried in determining acceptable sub-polynomials in one prior approach.

7. Prior Approach to Determining the Combinations of Orders of the Sub-Polynomial FIG. 5 is diagram illustrating the combination order values which are tried while determining a suitable piece-wise polynomial. It is assumed for illustration that there are only two dimensions to the input vectors, and that X and Y dimensions have respective maximum orders of 3 and 4, and it is required that the total order value does not exceed 4. As noted above, at least to avoid the over-fit situation, it is desirable to keep the maximum order value at a low number. Accordingly, small order values are tried first, as described below.

According to the prior approach of FIG. 5, the total order value is started with 1 and corresponding combination of order values are tried (i.e., curve fitting attempted). A higher total order value is tried if an acceptable polynomial is not found for all combination of order values with the total being less than the higher total order value.

Thus, for a total order value of 1, the combination of (1,0) and then (0,1) are tried. Assuming an acceptable polynomial is not found, the total order value is increased to 2, and the combinations of (0,2), (1,1) and (2,0) are tried. Assuming an acceptable polynomial is not found, then for a total order value of 3, the combinations of (3,0), (2,1), (1,2) and (0,3) are tried. Assuming an acceptable polynomial is yet not found, then for a total value of 4, (0,4), (1,3), (2,2) are tried.

An aspect of the present invention minimizes the number of combinations of orders tried in determining acceptable polynomials based on a recognition that when the order in one dimension alone is increased and the result does lead to acceptable accuracy of the polynomial, the combinations with a lesser number for the order (of the dimension) can be ruled out. The approach is illustrated with reference to FIG. 6 (again assuming only two dimensions, as in FIG. 5).

Figure 6:
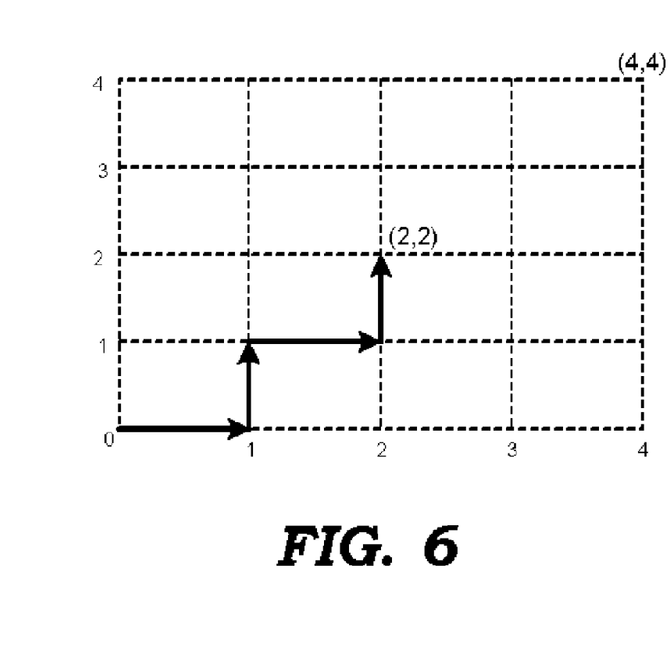
FIG. 6 is a graph illustrating the manner in which the number of combination of orders of sub-polynomials can be reduced in determining acceptable sub-polynomials according to an aspect of the present invention.

FIG. 6 indicates that a combination of (1,0) is tried first, and it is assumed that an acceptable polynomial is not found for the corresponding combination. Accordingly, a decision is made that values less than 1 (i.e., 0) for X-dimension can be ruled out. Hence, a combination of (1,1) is tried next. Assuming that an acceptable polynomial is not found (bu computations and appropriate checking) again, a value of 0 for Y-dimension is also ruled out. Then a combination of (2,1) is tried Assuming that an acceptable polynomial is not found even for the (2,1) combination, values less than 2 (i.e., 0 and 1) are ruled out in the X-dimension.

In comparison the approach if FIG. 5, it may be appreciated that to arrive at the combination of (2,2) only 4 combinations are tried in the approach of FIG. 6, whereas 12 combinations are tried according to the approach o FIG. 5. The computational requirements are reduced due to the use of the approach of FIG. 6.

While the above example is described with respect to software code implemented as a 'function', it should be understood that the approaches can be implemented using other mechanisms such as procedures. All such mechanisms are generally referred to as routines.

Thus, using such approaches data representing characteristics of cells in a library can be modeled for various combinations. The corresponding polynomial can the be used to determine the parameter value for each combination if input vectors (i.e., process, voltage, temperatures, loads, combination) by minimal combination (without having to use excessive memory space). As a result large memory space requirements may be avoided, for example, in digital processing system

8. Conclusion

While various embodiments of the present invention have been described above, it should be understood that they have been presented by way of example only, and not limitation. Thus, the breath and scope of the present invention should not be limited by any of the above described exemplary embodiments, but should be defined only in accordance with the following claims and their equivalents.

What is claimed is:

1. A method of generating a plurality of piece-wise polynomials representing an input data set with input vectors of multiple dimensions and corresponding output values, said method comprising:

receive a set of parameters providing acceptance criteria for said plurality of piece-wise polynomials;

set a present split dimension to equal one of said multiple dimensions;

set a present sub-domain to equal a portion of a data set along said present split dimension;

determining whether an acceptable polynomial representing said present sub-domain exists;

if said acceptable polynomial exists, setting a temporary polynomial to said acceptable polynomial whereby said temporary polynomial corresponds to said present sub-domain, expanding said present sub-domain along said present split dimension and performing said determining;

if said acceptable polynomial does not exist, saving said temporary polynomial as a piece-wise polynomial for the corresponding present sub-domain, increasing said present sub domain to cover more of an unresolved data set along said present split dimension, wherein said unresolved data set represents a portion of said input data set not yet covered by said piece-wise polynomial;

if said acceptable polynomial does not exist, changing said present split dimension to equal another one of said multiple dimensions; and wherein said input data set comprises characterization data for a cell library used in the design of integrated circuits.

2. The method of claim 1, if said acceptable polynomial does not exist, wherein said changing is performed only if a number of points in said unresolved data set along said present split dimension equals 2.

3. The method of claim 2 if said acceptable polynomial does not exist, wherein said determining is implemented in the form of a routine which is called recursively.

4. The method of claim 1, wherein said acceptable polynomial comprises a plurality of sub-polynomials which are multiplied to form said acceptable polynomial, wherein a corresponding one of a plurality of orders is associated with each of said plurality of sub-polynomials, said determining comprises:

increasing only a first order to a first value, said first order being contained in said plurality of orders;

computing a corresponding polynomial with said first order being equal to said first value;

checking whether said corresponding polynomial forms said acceptable polynomial; and ruling out combinations of said first order with lesser than said first value in further determination of said acceptable polynomial.

5. A computer readable medium carrying one or more sequences of instructions for causing a system to generate a plurality of piece-wise polynomials representing an input data set with input vectors of multiple dimensions and corresponding output values, wherein execution of said one or more sequences of instructions by one or more processors contained in said system causes said one or more processors to perform the actions of:

receive a set of parameters providing acceptance criteria for said plurality of piece-wise polynomials;

set a present split dimension to equal one of said multiple dimensions;

set a present sub-domain to equal a portion of a data set along said present split dimension;

determining whether an acceptable polynomial representing said present sub-domain exists;

if said acceptable polynomial exists, setting a temporary polynomial to said acceptable polynomial whereby said temporary polynomial corresponds to said present sub-domain, expanding said present sub-domain along said present split dimension and performing said determining;

if said acceptable polynomial does not exist, saving said temporary polynomial as a piece-wise polynomial for the corresponding present sub-domain, increasing said present sub domain to cover more of an unresolved data set along said present split dimension, wherein said unresolved data set represents a portion of said input data set not yet covered by said piece-wise polynomial;

if said acceptable polynomial does not exist, changing said present split dimension to equal another one of said multiple dimensions; and wherein said input data set comprises characterization data for a cell library used in the design of integrated circuits.

6. The computer readable medium of claim 5, if said acceptable polynomial does not exist, wherein said changing is performed only if a number of points in said unresolved data set along said present split dimension equals 2.

7. The computer readable medium of claim 6 if said acceptable polynomial does not exist, wherein said determining is implemented in the form of a routine which is called recursively.

8. The computer readable medium of claim 5, wherein said acceptable polynomial comprises a plurality of sub-polynomials which are multiplied to form said acceptable polynomial, wherein a corresponding one of a plurality of orders is associated with each of said plurality of sub-polynomials, said determining comprises:

increasing only a first order to a first value, said first order being contained in said plurality of orders;

computing a corresponding polynomial with said first order being equal to said first value;

checking whether said corresponding polynomial forms said acceptable polynomial; and ruling out combinations of said first order with lesser than said first value in further determination of said acceptable polynomial.

* * * * *